(12) United States Patent
Seidel et al.

(10) Patent No.: US 7,674,855 B2
(45) Date of Patent: Mar. 9, 2010

(54) POLYCARBONATE MOLDING COMPOSITIONS WITH IMPROVED MELT FLOW AND CHEMICAL RESISTANCE

(75) Inventors: Andreas Seidel, Dormagen (DE); Thomas Eckel, Dormagen (DE); Marc Vathauer, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 367 days.

(21) Appl. No.: 10/872,076

(22) Filed: Jun. 18, 2004

(65) Prior Publication Data
US 2005/0009970 A1 Jan. 13, 2005

(30) Foreign Application Priority Data
Jun. 26, 2003 (DE) ............... 103 28 665

(51) Int. Cl.
*C08L 69/00* (2006.01)
*C08L 55/02* (2006.01)

(52) U.S. Cl. .................. 525/63; 525/64; 525/70; 525/71; 525/79; 524/115; 524/280; 524/504; 524/729

(58) Field of Classification Search .......... 524/115, 524/280, 504, 729; 525/63, 64, 70, 71, 79
See application file for complete search history.

(56) References Cited

U.S. PATENT DOCUMENTS

| 5,302,663 A * | 4/1994 | Eichenauer et al. ........... 525/67 |
| 2003/0166812 A1 * | 9/2003 | Taniguchi et al. ........... 526/274 |
| 2004/0249027 A1 * | 12/2004 | Lim et al. ..................... 524/95 |

FOREIGN PATENT DOCUMENTS

| EP | 0 771 852 A2 | 5/1997 |
| EP | 771852 A2 * | 5/1997 |
| EP | 1142956 A1 * | 10/2001 |
| WO | WO 0170904 A1 * | 9/2001 |
| WO | 03/022928 | 3/2003 |

* cited by examiner

*Primary Examiner*—Kelechi C Egwim
(74) *Attorney, Agent, or Firm*—John E. Mrozinski, Jr.; Noland J. Cheung

(57) ABSTRACT

A thermoplastic molding composition having improved melt flow and chemical resistance is disclosed. The composition contains A) at least one member selected from the group consisting of aromatic polycarbonate and polyester carbonate, B) a graft polymer of at least one vinyl monomer on at least one rubber having a glass transition temperature of <10° C. as graft base and C) vinyl (co)polymer having weight-average molecular weight of 1500 to 5000 g/mol and glass transition temperature of >40° C. The composition may optionally further contain D) a phosphorus-based flame retardant and E) an anti-dripping agent.

13 Claims, No Drawings

POLYCARBONATE MOLDING COMPOSITIONS WITH IMPROVED MELT FLOW AND CHEMICAL RESISTANCE

FIELD OF THE INVENTION

The invention concerns thermoplastic molding compositions and more particularly compositions containing polycarbonate and rubber-modified vinyl (co)polymers.

SUMMARY OF THE INVENTION

A thermoplastic molding composition having improved melt flow and chemical resistance is disclosed. The composition contains A) at least one member selected from the group consisting of aromatic polycarbonate and polyester carbonate, B) a graft polymer of at least one vinyl monomer on at least one rubber having a glass transition temperature of <10° C. as graft base and C) vinyl (co)polymer having a weight-average molecular weight of 1500 to 5000 g/mol and glass transition temperature of >40° C. The composition may optionally further contain D) a phosphorus-based flame retardant and E) an anti-dripping agent.

BACKGROUND OF THE INVENTION

Polymer blends made from polycarbonate and acrylonitrile-butadiene-styrene copolymer (ABS) have long been known. Their full range of properties, comprising high heat resistance, good (low-temperature) strength and improved processing properties in comparison to pure polycarbonate, make PC+ABS blends particularly suitable for interior and exterior automotive applications, for example.

These blends may be made flame resistant with halogen-based and in particular with halogen-free flame retardants. Flame-resistant PC+ABS blends, particularly those based on halogen-free phosphoric acid esters as flame retardants, have become established in electrical and information technology applications over the last 15 years.

For the processing, i.e., the shaping, of molding compositions, which for most of the afore-mentioned applications is carried out by injection molding, good melt flow is essential. Improved melt flow allows greater design freedom, the production of larger molded parts with few gate marks (i.e., few weld lines, which generally indicate a mechanical weak spot in the molded parts), or a reduction in the processing temperature, through which On the other hand, the consumer articles produced from the molding compositions are expected to display mechanical and thermal ruggedness, i.e., good strength and heat resistance, but also in particular a good resistance to chemicals, greases and oils and household cleaning products.

A simultaneous improvement in processing behavior and chemical resistance, with sustained heat resistance, is not generally achievable. For example, although the flowability of PC+ABS blends may be improved by reducing the average molecular weight of the polycarbonate used, the chemical resistance of the material suffers severely as a consequence. The chemical resistance may be increased by using special ABS components, but the flowability of the molding composition generally suffers as a consequence. In PC+ABS blends that have been treated with phosphoric acid esters to make them flame resistant, the flowability may be improved by increasing the amount of flame retardant, but the heat resistance in particular suffers as a consequence.

The object of the present invention was thus to provide PC+ABS compositions which are characterized by improved melt flow combined with improved chemical resistance, with sustained heat resistance.

DETAILED DESCRIPTION OF THE INVENTION

Surprisingly it was found that a simultaneous improvement in melt flow and chemical resistance may be achieved by adding low-molecular-weight vinyl (co)polymers having a weight-average molecular weight $M_w$ of 1500 to 5000 g/mol and a $T_g$ of >40° C. to PC+ABS compositions, which may be made flame resistant with phosphoric acid esters, without in the process reducing the heat resistance by any significant degree.

The present invention thus provides compositions containing:

A) aromatic polycarbonate or polyester carbonate or mixtures thereof,
B) rubber-modified vinyl (co)polymers,
C) vinyl (co)polymers having a weight-average molecular weight $M_w$ of 1500 to 5000 g/mol and a $T_g$ of >40° C., and, optionally
D) phosphorus-based flame retardants,
E) anti-dripping agents,
F) polymer additives and/or other polymer components.

In particular, this invention concerns compositions containing

A) 20 to 98 parts by weight, preferably 30 to 95 parts by weight, in particular 40 to 90 parts by weight of aromatic polycarbonate and/or polyester carbonate,
B) 1 to 80 parts by weight, preferably 2 to 70 parts by weight, in particular 3 to 50, most particularly preferably 3 to 40 parts by weight of rubber-modified vinyl (co)polymer,
C) 0.1 to 20 parts by weight, preferably 0.2 to 15 parts by weight, in particular 0.5 to 10 parts by weight of vinyl (co)polymers having a weight-average molecular weight $M_w$ of 1500 to 5000 g/mol and a $T_g$ of >40° C., and optionally D) 1 to 30 parts by weight, preferably 2 to 25 parts by weight, in particular 2 to 20 parts by weight of a phosphorus compound as flame retardant,
E) 0 to 1 part by weight, preferably 0.1 to 0.5 parts by weight, in particular 0.2 to 0.5 parts by weight of an anti-dripping agent, preferably a fluorinated polyolefin, and
F) up to 20 parts by weight, preferably up to 15 parts by weight, in particular up to 10 parts by weight of polymer additives or other polymer components, the parts by weight of all components being standardized such that the sum of all parts by weight is 100.

Component A aromatic polycarbonates and/or aromatic polyester carbonates, in accordance with component A that are suitable according to the invention, are known from the literature or may be prepared by methods known from the literature (for the preparation of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g., DE-A 3 077 934).

Aromatic polycarbonates are prepared for example by melt processes or by reacting diphenols with carbonic acid halides, preferably phosgene, and/or with aromatic dicarboxylic acid dihalides, preferably benzenedicarboxylic acid dihalides, by the interfacial polycondensation process, optionally using chain terminators, for example, monophenols, and optionally using trifunctional or higher-functional branching agents, for example, triphenols or tetraphenols.

Dihydroxy compounds suitable for the preparation of the aromatic polycarbonates and/or aromatic polyester carbonates are preferably those having the formula (I)

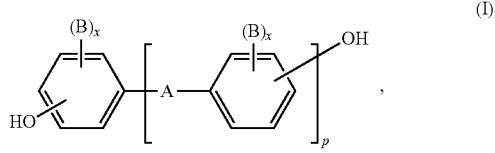

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which other aromatic rings optionally containing heteroatoms may be condensed, or a radical having the formula (II) or (III)

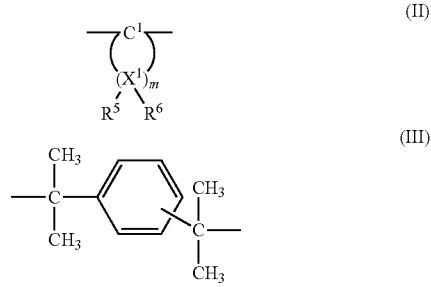

B is $C_1$ to $C_{12}$ alkyl, preferably methyl, halogen, preferably chlorine and/or bromine x is mutually independently 0, 1 or 2, p is 1 or 0, and $R^5$ and $R^6$ is individually selected for each $X^1$ and mutually independently denote hydrogen or $C_1$ to $C_6$ alkyl, preferably hydrogen, methyl or ethyl, $X^1$ denotes carbon and m denotes a whole number from 4 to 7, preferably 4 or 5, with the proviso that in at least one $X^1$ atom $R^5$ and $R^6$ are both alkyl.

Preferred dihydroxy compounds are hydroquinone, resorcinol, dihydroxy-diphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropyl benzenes along with their ring-brominated and/or ring-chlorinated derivatives.

Particularly preferred diphenols are 4,4'-dihydroxydiphenyl, bisphenol A, 2,4-bis-(4-hydroxyphenyl)-2-methyl butane, 1,1-bis-(4-hydroxyphenyl) cyclohexane, 1,1-bis-(4-hydroxyphenyl)-3.3.5-trimethyl cyclohexane, 4,4'-dihydroxydiphenyl sulfide, 4,4'-dihydroxydiphenyl sulfone and dibrominated and tetrabrominated or chlorinated derivatives thereof such as, e.g., 2,2-bis-(3-chloro-4-hydroxyphenyl) propane, 2,2-bis-(3,5-dichloro-4-hydroxyphenyl) propane or 2,2-bis-(3,5-dibromo-4-hydroxyphenyl) propane, 2,2-bis-(4-hydroxyphenyl) propane (bisphenol A) is especially preferred.

The diphenols can be used individually or in any combination whatsoever. The diphenols are known from the literature and may be obtained by methods known from the literature.

Suitable chain terminators for the preparation of the thermoplastic, aromatic polycarbonates are, for example, phenol, p-chlorophenol, p-tert.-butyl phenol or 2,4,6-tribromophenol, as well as long-chain alkyl phenols such as 4-(1,3-tetramethyl butyl) phenol according to DE-A 2 842 005 or monoalkyl phenol or dialkyl phenols having a total of 8 to 20 C atoms in the alkyl substituents, such as 3,5-di-tert.-butyl phenol, p-iso-octyl phenol, p-tert.-octyl phenol, p-dodecyl phenol and 2-(3,5-dimethyl heptyl) phenol and 4-(3,5-dimethyl heptyl) phenol. The amount of chain terminators to be used is generally between 0.5 mol % and 10 mol %, relative to the molar sum of diphenols used in each case.

The thermoplastic, aromatic polycarbonates may be branched by known means, and preferably by the incorporation of 0.05 to 2.0 mol %, relative to the sum of diphenols used, of trifunctional or higher-functional compounds, for example those having three or more phenolic groups.

Both homopolycarbonates and copolycarbonates are suitable. 1 to 25 wt. %, preferably 2.5 to 25 wt. % (relative to the total amount of diphenols to be used) of polydiorganosiloxanes having hydroxyaryloxy terminal groups may also be used in the production of copolycarbonates according to the invention in accordance with component A. These are known (e.g., U.S. Pat. No. 3,419,634) or may be produced by methods known from the literature. The production of polydiorganosiloxane-containing copolycarbonates is described for example in DE-A 3 334 782.

In addition to the bisphenol A homopolycarbonates, preferred polycarbonates are the copolycarbonates of bisphenol A having up to 15 mol %, relative to the molar sums of diphenols, of other diphenols cited as being preferred or particularly preferred.

Aromatic dicarboxylic acid dihalides for the production of aromatic polyester carbonates are preferably the di-acid dichlorides of isophthalic acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

In the production of polyester carbonates a carbonic acid halide, preferably phosgene, is also incorporated as a bifunctional acid derivative.

Examples of chain terminators for the production of aromatic polyester carbonates also include, in addition to the monophenols already cited, chloroformic acid esters thereof and the acid chlorides of aromatic monocarboxylic acids, which may optionally be substituted with $C_1$ to $C_{22}$ alkyl groups or with halogen atoms, along with aliphatic $C_2$ to $C_{22}$ monocarboxylic acid chlorides.

The quantity of chain terminators in each case is 0.1 to 10 mol %, relative to moles of diphenols in the case of phenolic chain terminators and to moles of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be both linear and branched by known means (see also DE-A 2 940 024 and DE-A 3 007 934 in this connection).

Examples of branching agents that may be used include trifunctional or polyfunctional carboxylic acid chlorides, such as trimesic acid trichloride, cyanuric acid trichloride, 3,3'-,4,4'-benzophenone tetracarboxylic acid tetrachloride, 1,4,5,8-naphthalene tetracarboxylic acid tetrachloride or pyromellitic acid tetrachloride, in quantities of 0.01 to 1.0 mol % (relative to dicarboxylic acid dichlorides used) or trifunctional or polyfunctional phenols, such as phloroglucinol, 4,6-dimethyl-2,4,6-tri-(4-hydroxyphenyl) heptene-2,4, 4-dimethyl-2,4,6-tri-(4-hydroxyphenyl) heptane, 1,3,5-tri-(4-hydroxyphenyl) benzene, 1,1,1-tri-(4-hydroxyphenyl) ethane, tri-(4-hydroxyphenyl) phenyl methane, 2,2-bis-[4,4-bis-(4-hydroxyphenyl) cyclohexyl]propane, 2,4-bis-(4-hydroxyphenyl isopropyl) phenol, tetra-(4-hydroxyphenyl) methane, 2,6-bis-(2-hydroxy-5-methylbenzyl)-4-methyl phenol, 2-(4-hydroxyphenyl)-2-(2,4-dihydroxyphenyl) propane, tetra-(4-[4-hydroxyphenyl isopropyl]phenoxy) methane, 1,4-bis-[4,4'-dihydroxytriphenyl) methyl]benzene, in quantities of 0.01 to 1.0 mol %, relative to diphenols used. Phenolic branching agents may be included with the diphenols, acid chloride branching agents may be introduced together with the acid dichlorides.

The proportion of carbonate structural units in the thermoplastic, aromatic polyester carbonates may vary widely. The proportion of carbonate groups is preferably up to 100 mol %, in particular up to 80 mol %, particularly preferably up to 50 mol %, relative to the sum of ester groups and carbonate groups. Both the ester and the carbonate component of the aromatic polyester carbonates may be in the form of blocks or randomly distributed in the polycondensate.

The relative solution viscosity ($\eta_{rel}$) of the aromatic polycarbonates and polyester carbonates is in the range from 1.18 to 1.4, preferably 1.20 to 1.32 (measured in solutions of 0.5 g polycarbonate or polyester carbonate in 100 ml methylene chloride solution at 25° C.).

The thermoplastic, aromatic polycarbonates and polyester carbonates may be used alone or in any combination.

Component B

Component B comprises graft polymers B 1 of at least one vinyl monomer on at least one rubber having a glass transition temperature of <10° C. as graft base.

Preferred graft polymers B1 are one or more graft polymers of 5 to 95 wt. %, preferably 10 to 90 wt. %, of monomers of a mixture comprising monomers of groups 1 and 2 wherein 1. 50 to 99 wt. %, in particular 50 to 90, more preferably 55 to 85, most particularly preferably 60 to 80 wt. % of vinyl aromatics and/or ring-substituted vinyl aromatics (such as, e.g., styrene, α-methyl styrene, p-methyl styrene, p-chlorostyrene) and/or methacrylic acid ($C_1$-$C_8$) alkyl esters (such as methyl methacrylate, ethyl methacrylate) and 2. 1 to 50 wt. %, in particular 10 to 50, more preferably 15 to 45, most particularly preferably 20 to 40 wt. % of vinyl cyanides (unsaturated nitriles such as acrylonitrile and methacrylonitrile) and/or (meth)acrylic acid ($C_1$-$C_8$) alkyl esters (such as methyl methacrylate, n-butyl acrylate, t-butyl acrylate) and/or derivatives (such as anhydrides and imides) of unsaturated carboxylic acids (for example maleic anhydride and N-phenyl maleinimide) on 95 to 5, preferably 80 to 10 wt. % of one or more rubbers having glass transition temperatures of <10° C., preferably <0° C., particularly preferably <−20° C. as graft base.

The graft base (rubber base) generally has a median particle size ($d_{50}$ value) of 0.05 to 10 µm, preferably 0.1 to 5 µm, particularly preferably 0.2 to 2 µm.

The median particle size $d_{50}$ is the diameter above and below which respectively 50 wt. % of the particles lie. It can be determined by ultracentrifuge measurement (W. Scholtan, H. Lange, Kolloid, Z. und Z. Polymere 250 (1972), 782-1796).

Preferred group 1 monomers are selected from at least one of the monomers styrene, α-methyl styrene and methyl methacrylate, preferred group 2 monomers are selected from at least one of the monomers acrylonitrile, maleic anhydride and methyl methacrylate.

Particularly preferred monomers are styrene from group 1 and acrylonitrile from group 2.

Suitable graft bases for the graft polymers B1 are for example diene rubbers, EP(D)M rubbers, i.e., those based on ethylene/propylene and optionally diene, acrylate, polyurethane, silicone, chloroprene and ethylene/vinyl acetate rubbers, as well as composite rubbers consisting of two or more of the aforementioned systems, e.g., silicone-acrylate rubbers.

Diene rubbers within the meaning of the present invention are those based, e.g., on butadiene, isoprene, etc. or mixtures of diene rubbers or copolymers of diene rubbers or mixtures thereof with other copolymerizable monomers (e.g., in accordance with groups 1 and 2 above), such as, e.g., butadiene-styrene copolymers, with the proviso that the glass transition temperature of the graft base is <10° C., preferably <0° C., particularly preferably <−10° C.

Pure polybutadiene rubber is particularly preferred.

Particularly preferred graft polymers B 1 are, e.g., ABS polymers (emulsion, bulk and suspension ABS), such as are described, e.g., in DE-A 2 035 390 (=U.S. Pat. No. 3,644,574) or in DE-A 2 248 242 (=GB-PS 1 409 275) or in Ullmanns Enzyklopädie der Technischen Chemie, Vol. 19 (1980), p. 280 ff. The gel content of the graft base is at least 30 wt. %, preferably at least 40 wt. %.

The gel content of the graft base is determined at 25° C. in toluene (M. Hoffmann, H. Krömer, R. Kuhn, Polymeranalytik I and II, Georg Thieme-Verlag, Stuttgart 1977).

The graft copolymers B1 are produced by radical polymerization, e.g., by emulsion, suspension, solution or bulk polymerization, preferably by emulsion or bulk polymerization.

Particularly suitable graft rubbers are also ABS polymers produced by redox initiation with an initiator system comprising organic hydroperoxide and ascorbic acid according to U.S. Pat. No. 4,937,285.

Since it is known that the graft monomers are not necessarily completely grafted onto the graft base during the graft reaction, according to the invention, the term "graft polymer" also refers to such products that are obtained by (co)polymerization of the graft monomers in the presence of the graft base and that co-accumulate during preparation.

Acrylate rubbers that are suitable as the graft base are preferably polymers of acrylic acid alkyl esters, optionally also copolymers having up to 40 wt. %, relative to the graft base, of other polymerizable, ethylene-unsaturated monomers. The preferred polymerizable acrylic acid esters include $C_1$-$C_8$ alkyl esters, for example methyl, ethyl, butyl, n-octyl and 2-ethylhexyl ester; haloalkyl esters, preferably halogen $C_1$-$C_8$ alkyl esters, such as chloroethyl acrylate, and mixtures of these monomers.

Monomers having more than one polymerizable double bond may be copolymerized for crosslinking. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as divinyl and trivinyl benzenes; but also triallyl phosphate and diallyl phthalate.

Preferred crosslinking monomers are allyl methacrylate, ethylene glycol dimethacrylate, diallyl phthalate and heterocyclic compounds displaying at least three ethylene-unsaturated groups.

Particularly preferred crosslinking monomers are the cyclic monomers triallyl cyanurate, triallyl isocyanurate, triacryloyl hexahydro-s-triazine, triallyl benzenes. The quantity of crosslinking monomers is preferably 0.02 to 5, in particular 0.05 to 2 wt. %, relative to the graft base.

In the case of cyclic crosslinking monomers having at least three ethylene-unsaturated groups, it is advantageous to restrict the quantity to below 1 wt. % of the graft base.

Preferred "other" polymerizable, ethylene-unsaturated monomers which can optionally serve to produce the graft base in addition to the acrylic acid esters are, e.g., acrylonitrile, styrene, α-methyl styrene, acrylamides, vinyl $C_1$-$C_6$ alkyl ethers, methyl methacrylate, butadiene. Preferred acrylate rubbers as the graft base are emulsion polymers displaying a gel content of at least 60 wt. %.

Other suitable graft bases are silicone rubbers having graft-active sites, such as are described in DE-A 3 704 657, DE-A 3 704 655, DE-A 3 631 540 and DE-A 3 631 539.

Component B may also contain one or more thermoplastic vinyl (co)polymers B2, in which the aforementioned graft polymers B1 are preferably dispersed in the composition according to the invention.

Suitable vinyl (co)polymers B2 are polymers of at least one monomer from the group comprising vinyl aromatics, vinyl cyanides (unsaturated nitriles), (meth)acrylic acid ($C_1$ to $C_8$) alkyl esters, unsaturated carboxylic acids and derivatives (such as anhydrides and imides) of unsaturated carboxylic acids. Particularly suitable are (co)polymers comprising 50 to 99, preferably 60 to 80 wt. % of vinyl aromatics and/or ring-substituted vinyl aromatics, such as e.g., styrene, α-methyl styrene, p-methyl styrene, p-chlorostyrene, and/or methacrylic acid ($C_1$ to $C_8$) alkyl esters, such as methyl methacrylate, ethyl methacrylate, and 1 to 50, preferably 20 to 40 wt. % of vinyl cyanides (unsaturated nitriles) such as acrylonitrile and methacrylonitrile and/or (meth)acrylic acid ($C_1$-$C_8$) alkyl esters (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenyl maleinimide).

The (co)polymers B2 are resinous and thermoplastic.

The copolymer comprising styrene and acrylonitrile is particularly preferred.

The (co)polymers according to B2 are known and may be produced by radical polymerization, in particular by emulsion, suspension, solution or bulk polymerization. The (co)polymers preferably have average molecular weights $M_w$ (weight average, determined by light scattering or sedimentation) of between 15,000 and 200,000, in particular between 50,000 and 180,000. Excluded from B2 are vinyl (co)polymers corresponding to Component C.

Component C

Suitable for use as component C are vinyl (co)polymers, i.e., polymers or copolymers of at least one monomer from the group comprising vinyl aromatics, vinyl cyanides (unsaturated nitriles), (meth)acrylic acid ($C_1$-$C_8$) alkyl esters, unsaturated carboxylic acids and derivatives (such as anhydrides and imides) of unsaturated carboxylic acids. Particularly suitable are (co)polymers containing at least one monomer selected from the group comprising styrene, α-methyl styrene, acrylic acid, methacrylic acid, methacrylic acid ($C_1$ to $C_4$) alkyl ester, acrylonitrile and maleic anhydride.

In contrast to component B2, component C is characterized by a substantially lower average molecular weight. The weight-average molecular weight of component C is between 1500 and 5000 g/mol, preferably between 2000 and 4500 g/mol. The chemical composition of component C is such that the glass transition temperature ($T_g$) of component C is >40° C., preferably >50° C., and component C displays no significant signs of decomposition at the conventional processing temperatures of PC+ABS compositions (260 to 280° C.). The glass transition temperature does not exceed 70° C. The weight loss measured in dynamic thermogravimetric analysis (TGA) at 280° C. at a heating rate of 10 K/min in a nitrogen stream is at a maximum of 10 wt. %, preferably a maximum of 5 wt. %, relative to component C.

These low weight losses are achieved if the proportion of α-methyl styrene in the copolymer is less than 22 wt. %, preferably less than 18 wt. %, in particular 1.5 to 17 wt. %, and/or the proportion of acrylate in copolymer C) is greater than 0 and less than 22 wt. %, preferably greater than 0 and less than 20 wt. %, in particular greater than 0 and less than 17 wt. %. A particularly preferred lower limit for the proportion of acrylate in the copolymer is 3 wt. %, in particular 5 wt. %, the quantities being stated relative to the component C).

Preferred acrylates are butyl acrylate or glycidyl methacrylate.

The vinyl (co)polymers in accordance with component C are known and are also available and sold commercially as flow additives, e.g., under the trade name Joncryl® by Johnson Polymers Inc. (Sturtevant, Wis., USA) inter alia.

The vinyl (co)polymers in accordance with component C may be produced by methods known from the literature, for example, by the process described in U.S. Pat. Nos. 4,414,370, 4,529,787, 4,546,160 and 5,508,366 all incorporated herein by reference.

Component D

Phosphorus-containing flame retardants within the meaning of the invention are preferably selected from the groups comprising monomeric and oligomeric phosphoric and phosphonic acid esters, phosphonate amines and phosphazenes, whereby mixtures of several components selected from one or more of these groups may also be used as flame retardants. Other halogen-free phosphorus compounds not mentioned here specifically may also be used alone or in any combination with other halogen-free phosphorus compounds.

Preferred monomeric and oligomeric phosphoric and phosphonic acid esters are phosphorus compounds having the general formula (IV)

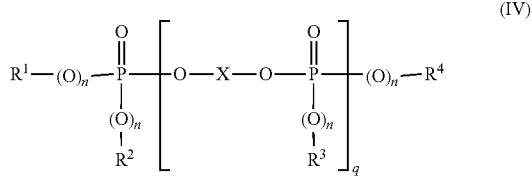

(IV)

wherein
$R^1$, $R^2$, $R^3$ and $R^4$ mutually independently denote optionally halogenated $C_1$ to $C_8$ alkyl, $C_5$ to $C_6$ cycloalkyl, optionally substituted with alkyl, preferably $C_1$ to $C_4$ alkyl, and/or halogen, preferably chlorine, bromine, $C_6$ to $C_{20}$ aryl or $C_7$ to $C_{12}$ aralkyl, n mutually independently denotes 0 or 1 q denotes 0 to 30 and

X denotes a mononuclear or polynuclear aromatic radical having 6 to 30 C atoms, or a linear or branched aliphatic radical having 2 to 30 C atoms, which may be OH-substituted and can contain up to 8 ether bonds.

$R^1$, $R^2$, $R^3$ and $R^4$ preferably mutually independently stand for $C_1$ to $C_4$ alkyl, phenyl, naphthyl or phenyl $C_1$-$C_4$ alkyl. The aromatic groups $R^1$, $R^2$, $R^3$ and $R^4$ may be substituted with halogen and/or alkyl groups, preferably chlorine, bromine and/or $C_1$-$C_4$ alkyl. Particularly preferred aryl radicals are cresyl, phenyl, xylenyl, propyl phenyl or butyl phenyl, and the corresponding brominated and chlorinated derivatives thereof.

X in formula (IV) preferably denotes a mononuclear or polynuclear aromatic radical with 6 to 30 C atoms. This is preferably derived from diphenols having formula (I).

n in formula (IV) is independently 0 or 1, n preferably equalling 1.

q stands for values from 0 to 30. If mixtures of different components having formula (IV) are used, mixtures preferably having number-average q values of 0.3 to 20, particularly preferably 0.5 to 10, in particular 0.5 to 6, may be used.

X particularly preferably stands for any of the following

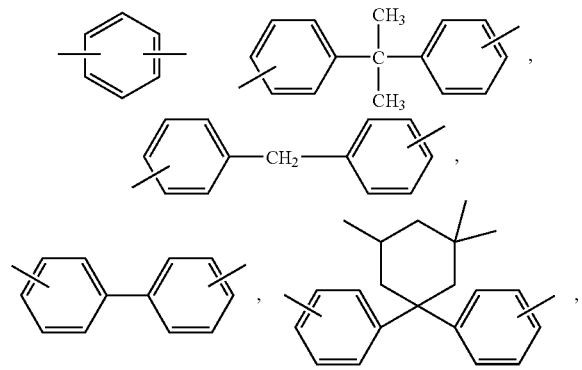

or chlorinated or brominated derivatives thereof, in particular X is derived from resorcinol, hydroquinone, bisphenol A or diphenyl phenol. X is particularly preferably derived from bisphenol A.

The use of oligomeric phosphoric acid esters having formula (IV) derived from bisphenol A is particularly advantageous, since compositions containing this phosphorus compound display a particularly high stress cracking resistance and hydrolysis resistance and a particularly low tendency towards plate-out when processed by injection molding. Furthermore, a particularly high heat resistance may be achieved with these flame retardants.

Monophosphates (q=0), oligophosphates (q=1-30) or mixtures of mono- and oligophosphates may be used as component C according to the invention.

Monophosphorus compounds having formula (IV) are in particular tributyl phosphate, tris-(2-chloroethyl) phosphate, tris-(2,3-dibromoprobyl) phosphate, triphenyl phosphate, tricresyl phosphate, diphenyl cresyl phosphate, diphenyl octyl phosphate, diphenyl-2-ethyl cresyl phosphate, tri-(isopropylphenyl) phosphate, halogen-substituted aryl phosphates, methyl phosphonic acid dimethyl esters, methyl phosphenic acid diphenyl esters, phenyl phosphonic acid diethyl esters, triphenyl phosphine oxide or tricresyl phosphine oxide.

The phosphorus compounds according to component C formula (IV) are known (cf., e.g., EP-A 363 608, EP-A 640 655) or may be produced by known methods in an analogous way (e.g., Ullmanns Encyklopädie der technischen Chemie, Vol. 18, p. 301 ff. 1979; Houben-Weyl, Methoden der organischen Chemie, Vol. 12/1, p. 43; Beilstein, Vol. 6, p. 177).

The average q values may be determined by determining the composition of the phosphate mixture (molecular weight distribution) by a suitable method (gas chromatography (GC), high-pressure liquid chromatography (HPLC), gel permeation chromatography (GPC)) and using it to calculate the average values for q.

Phosphonate amines are preferably compounds having the formula (V)

$$A_{3-y}\text{-}NB^1_y \qquad (V)$$

wherein

A stands for a radical having the formula (Va)

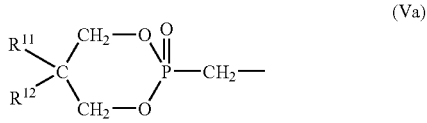

or (Vb)

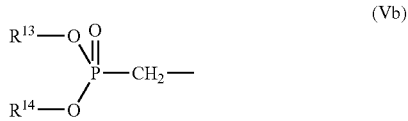

$R^{11}$ and $R^{12}$ mutually independently stand for unsubstituted or substituted $C_1$-$C_{10}$ alkyl or for unsubstituted or substituted $C_6$-$C_{10}$ aryl, $R^{13}$ and $R^{14}$ mutually independently stand for unsubstituted or substituted $C_1$-$C_{10}$ alkyl or unsubstituted or substituted $C_6$-$C_{10}$ aryl or $R^{13}$ and $R^{14}$ together stand for unsubstituted or substituted $C_3$-$C_{10}$ alkylene, y denotes the numerical values 0, 1 or 2 and $B^1$ independently stands for hydrogen, optionally halogenated $C_2$-$C_8$ alkyl, unsubstituted or substituted $C_6$-$C_{10}$ aryl.

$B^1$ preferably independently stands for hydrogen, for ethyl, n- or iso-propyl, which may be substituted with halogen, for unsubstituted or $C_1$-$C_4$ alkyl-substituted and/or halogen-substituted $C_6$-$C_{10}$ aryl, in particular phenyl or naphthyl.

Alkyl in $R^{11}$, $R^{12}$, $R^{13}$ and $R^{14}$ preferably independently stands for methyl, ethyl, n-propyl, iso-propyl, n-, iso-, sec.- or tert.-butyl, pentyl or hexyl.

Substituted alkyl in $R^{11}$, $R^{12}$, $R^{13}$ and $R^{14}$ preferably independently stands for halogen-substituted $C_1$-$C_{10}$ alkyl, in particular for monosubstituted or disubstituted methyl, ethyl, n-propyl, iso-propyl, n-, iso-, sec.- or tert.-butyl, pentyl or hexyl.

$C_6$-$C_{10}$ aryl in $R^{11}$, $R^{12}$, $R^{13}$ and $R^{14}$ preferably independently stands for phenyl, naphthyl or binaphthyl, in particular o-phenyl, o-naphthyl, o-binaphthyl, which may be substituted (generally mono-, di- or trisubstituted) with halogen.

$R^{13}$ and $R^{14}$ may form a ring structure together with the oxygen atoms to which they are directly bonded and the phosphorus atom.

The following may be cited by way of example and by preference: 5,5,5',5',5'',5''-hexamethyl tris-(1,3,2-dioxaphosphorinane methane) amino-2,2',2''-trioxide having the formula (Va-1)

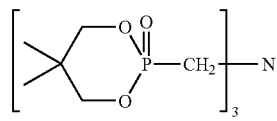

(Va-1)

(experimental product XPM 1000 from Solutia Inc., St. Louis, USA) 1,3,2-dioxaphosphorinane-2-methanamine, N-butyl-N[(5,5-dimethyl-1,3,2-dioxaphosphorinan-2-yl) methyl]-5,5-dimethyl-, P,2-dioxides; 1,3,2-dioxaphosphorinane-2-methanamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-2-oxides; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Also preferred are:

Compounds having the formula (Va-2) or (Va-3)

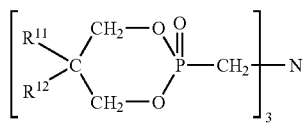

(Va-2)

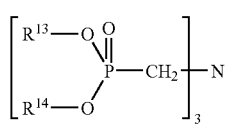

(Va-3)

wherein $R^{11}$, $R^{12}$, $R^{13}$ and $R^{14}$ have the meanings cited above.

Compounds having the formula (Va-2) and (Va-1) are particularly preferred.

The production of phosphonate amines is described for example in U.S. Pat. No. 5,844,028, incorporated herein by reference.

Phosphazenes are compounds having the formulae (VIa) and (VIb)

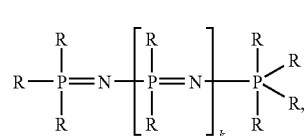

(VIa)

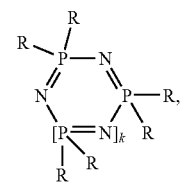

(VIb)

wherein

R is the same or different and stands for amino, for optionally halogenated, preferably fluorine-halogenated $C_1$ to $C_8$ alkyl, or for $C_1$ to $C_8$ alkoxy, $C_5$ to $C_6$ cycloalkyl, optionally substituted with alkyl, preferably $C_1$-$C_4$ alkyl, and/or halogen, preferably chlorine and/or bromine, for $C_6$ to $C_{20}$ aryl, preferably phenyl or naphthyl, $C_6$ to $C_{20}$ aryloxy, preferably phenoxy, naphthyloxy, or $C_7$ to $C_{20}$ aralkyl, preferably phenyl $C_1$-$C_4$ alkyl, k stands for 0 or a number from 1 to 15, preferably for a number from 1 to 10.

The following may be cited by way of example:

Propoxyphosphazene, phenoxyphosphazene, methyl phenoxyphosphazene, aminophosphazene and fluoroalkyl phosphazene.

Phenoxyphosphazene is preferred.

The phosphazenes may be used alone or as a mixture. The radical R may always be the same or two or more radicals in the formulae (VIa) and (VIb) may be different.

Phosphazenes and their production are described for example in EP-A 728 811, DE-A 1 961668 and WO 97/40092.

The flame retardants may be used alone or in any combination with one another or in combination with other flame retardants.

Component E

The flame retardants corresponding to component D are often used in combination with so-called anti-dripping agents, which reduce the tendency of the material to drip as it burns in the event of a fire. Compounds from the classes of substances comprising fluorinated polyolefins, silicones and aramid fibres may be cited here by way of example. These may also be used in the compositions according to the invention. Fluorinated polyolefins are preferably used as anti-dripping agents.

Fluorinated polyolefins are known and described for example in EP-A 0 640 655. They are sold by DuPont, for example, under the brand name Teflon® 30N.

The fluorinated polyolefins may be used both in pure form and in the form of a coagulated mixture of emulsions of the fluorinated polyolefins with emulsions of the graft polymers (component B1) or with an emulsion of a copolymer, preferably on a styrene/acrylonitrile or PMMA basis, the fluorinated polyolefin being mixed as an emulsion with an emulsion of the graft polymer or copolymer and then coagulated.

The fluorinated polyolefins may further be used as a pre-compound with the graft polymer (component B1) or a copolymer, preferably on a styrene/acrylonitrile or PMMA basis. The fluorinated polyolefins are mixed as a powder with a powder or pellets of the graft polymer or copolymer and melt compounded, generally at temperatures of 200 to 330° C., in conventional units such as internal mixers, extruders or twin screws.

The fluorinated polyolefins may also be used in the form of a masterbatch produced by emulsion polymerization of at least one monoethylene-unsaturated monomer in the presence of an aqueous dispersion of the fluorinated polyolefin. Preferred monomer components are styrene, acrylonitrile, methyl methacrylate and mixtures thereof. The polymer is used as a free-flowing powder after acid precipitation and subsequent drying.

The coagulates, pre-compounds or masterbatches conventionally have solids contents of fluorinated polyolefin of 5 to 95 wt. %, preferably 7 to 80 wt. %.

The fluorinated polyolefins are used in concentrations of 0 to 1 part by weight, preferably 0.1 to 0.5 parts by weight, in particular 0.2 to 0.5 parts by weight, these quantities relating to the pure fluorinated polyolefin if a coagulate, pre-compound or masterbatch is used.

Component F (Other Additives)

The compositions according to the invention may also contain at least one conventional polymer additive, such as a lubricant or release agent, for example pentaerythritol tetrastearate, a nucleating agent, an antistatic agent, a stabilizer, a filler or reinforcing agent, e.g., a silicate such as talc or wollastonite, another flame retardant or a flame retardant synergist, such as, e.g., a nanoscale inorganic material, and a dye or a pigment.

The compositions according to the invention may also contain other polymer components such as e.g. polyphenylene oxides, polyesters, epoxy resins or novolaks.

All stated parts by weight in this application are standardized such that the sum of the parts by weight of all components in the composition is 100.

The compositions according to the invention are produced by mixing the various components by known means and at temperatures from 200° C. to 300° C. and melt compounding and melt extruding them in conventional units such as internal mixers, extruders and twin screws.

The individual constituents may be mixed by known means both successively and simultaneously, both at around 20° C. (room temperature) and at elevated temperature.

The compositions according to the invention may be used in the production of all types of molded parts. These may be produced for example by injection molding, extrusion and blow molding processes. A further form of processing is the production of moldings by thermoforming from prefabricated sheets or films.

The invention, therefore, also provides a process for the production of the compositions, their use for the production of molded parts, and the molded parts themselves.

Examples of such molded parts are films, profiles, all types of housing sections, e.g., for domestic appliances such as juice extractors, coffee machines, mixers; for office equipment such as monitors, printers, copiers; also plates, pipes, electric wiring ducts, profiles for the construction sector, interior fittings and exterior applications; parts for the electrical engineering sector such as switches and plugs, and interior and exterior automotive parts.

The compositions according to the invention can in particular be used to produce the following molded parts, for example:

Interior fittings for rail vehicles, ships, aircraft, buses and cars, hub caps, housings for electrical appliances containing miniature transformers, housings for equipment for information dissemination and transfer, housings and cladding for medical purposes, massage equipment and housings, children's toy vehicles, two-dimensional wall panels, housings for safety equipment, rear spoilers, car body parts, heat-insulated transport containers, equipment for holding or caring for small animals, molded parts for plumbing and bathroom equipment, cover grids for fan openings, molded parts for garden sheds and tool sheds, housings for gardening equipment and safety elements for car interiors.

The examples below serve to illustrate the invention in more detail.

EXAMPLES

The components set out in Table 1 and briefly described below were melt compounded on a ZSK-25 at 260° C. Test specimens were produced on an Arburg 270 E injection molding machine at 260° C.

Component A

Linear polycarbonate based on bisphenol A with a relative solution viscosity of 1.28, measured in $CH_2Cl_2$ as solvent at 25° C. and in a concentration of 0.5 g/100 ml.; referred to in the table below as "PC".

Component B

B1: Graft polymer of 40 parts by weight of styrene and acrylonitrile in the weight ratio 73:27 on 60 parts by weight of particulate crosslinked polybutadiene rubber (median particle diameter $d_{50}$=0.3 μm), produced by emulsion polymerization; referred to in the table below as "ABS graft polymer".

B2: Styrene/acrylonitrile copolymer with a ratio by weight of styrene to acrylonitrile of 72:28 and an intrinsic viscosity of 0.55 dl/g (measured in dimethyl formamide at 20° C.); referred to in the table below as "SAN".

Component C

Joncryl® ADF-1350: styrene-acrylate copolymer from Johnson Polymers Inc. (Sturtevant, Wis., USA) with a weight-average molecular weight $M_w$ of 4000 g/mol and a glass transition temperature $T_g$ of 54° C. The weight loss measured in dynamic thermogravimetric analysis (TGA) at 280° C. at a heating rate of 10 K/min in a nitrogen stream is 3 wt. %.; referred to in the table below as "LMWSAN".

Component D

Bisphenol A-based oligophosphate; referred to in the table below as "BDP".

The fire behavior of the flame-resistant samples was measured in accordance with UL Subj. 94 V on specimens measuring 127 mm×12.7 mm×1.5 mm.

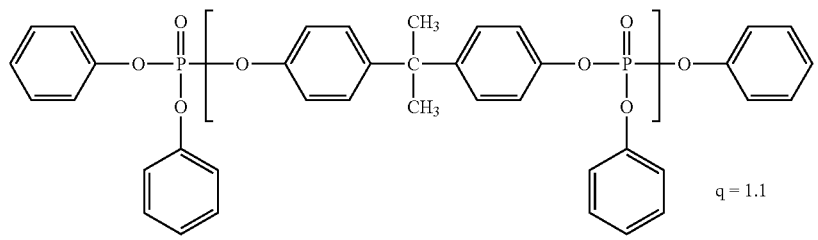

Component E

Tetrafluoroethylene polymer as a coagulated mixture of a graft polymer emulsion of the aforementioned component B 1 in water. The ratio by weight of graft polymer B1 to the tetrafluoroethylene polymer in the mixture is 90 wt. % to 10 wt. %. The tetrafluoroethylene polymer emulsion has a solids content of 60 wt. %; the average particle diameter is between 0.05 and 0.5 μm. The graft polymer emulsion has a solids content of 34 wt. %.

The emulsion of the tetrafluoroethylene polymer (Teflon® 30 N from DuPont) is mixed with the emulsion of the graft polymer B1 and stabilized with 1.8 wt. %, relative to polymer solids, of phenolic antioxidants. The mixture is coagulated at a temperature of 85 to 95° C. with an aqueous solution of $MgSO_4$ (Epsom salts) and acetic acid at pH 4 to 5, filtered and washed until it is practically free from electrolytes, then freed from the bulk of the water by centrifuging and subsequently dried to a powder at 100° C.; referred to in the table below as "PTFE".

Component F1

Pentaerythritol tetrastearate (PETS) as release agent

Component F2

Phosphite stabilizer; referred to in the table below as "Stabilizer".

Testing the Properties of the Molding Compositions According to the Invention

The notched impact strength is determined at room temperature in accordance with ISO 180/1A on specimens measuring 80 mm×10 mm×4 mm.

The heat resistance according to Vicat B120 is determined in accordance with ISO 306 on specimens measuring 80 mm×10 mm×4 mm.

The stress cracking behavior (ESC behavior) under the influence of chemicals is tested in accordance with DIN 53 449 on specimens measuring 80 mm×10 mm×4 mm. A mixture of 60 vol. % toluene and 40 vol. % isopropanol is used as the test medium. The samples are pre-extended using an arc-shaped jig and the time to fracture failure in this medium determined as a function of the pre-extension. In the flame-resistant compositions, the minimum pre-extension at which fracture failure occurs within 5 minutes is assessed. In the compositions without flame retardants, the time to fracture failure at a constant outer fiber strain of 0.8% was used as the assessment criterion.

The melt viscosity (referred to as "MV" in the table) is determined in accordance with DIN 54 811 at 260° C. and a shear rate of 1000 s$^{-1}$.

A summary of the properties of the composition according to the invention and of the specimens obtained from it is set out in Table 1.

TABLE 1

Molding compositions and their properties

|   |   | V1 | 1 | V2 | 2 |
|---|---|---|---|---|---|
| Components [parts by weight] | | | | | |
| A | (PC) | 92.7 | 90.0 | 69.4 | 67.4 |
| B1 | (ABS graft polymer) | 4.05** | 3.96** | 12.9 | 12.5 |
| B2 | (SAN) | — | — | 16.9 | 16.4 |
| C | (LMWSAN) | — | 2.9 | — | 2.9 |
| D | (BDP) | 2.3 | 2.2 | — | — |
| E* | (PTFE) | 0.45** | 0.44** | — | — |
| F1 | (PETS) | 0.4 | 0.4 | 0.7 | 0.7 |
| F2 | (Stabilizer) | 0.1 | 0.1 | 0.1 | 0.1 |
| Properties | | | | | |
| ESC (fracture) | | 0.8%/ 5 min | 1.2%/ 5 min | — | — |
| ESC (fracture) | | — | — | 0.8% 4 min | 0.8% 210 min |
| UL94 V (1.5 mm) | | V-0 | V-0 | — | — |
| MV (260° C./1000s$^{-1}$) [Pas] | | 530 | 494 | 286 | 242 |
| $a_k$ [kJ/m$^2$] | | 60 | 56 | 63 | 85 |
| Vicat B120 [° C.] | | 136 | 135 | 132 | 129 |

*used as PTFE masterbatch in accordance with component E
**from PTFE masterbatch It can be seen from Table 1 that the addition of the low-molecular-weight vinyl copolymer improves both the melt flow and the chemical resistance (ESC behavior). Flame resistance, notched impact strength and heat resistance remain largely unaffected within the limits of measuring accuracy.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of
    A) at least one member selected from the group consisting of aromatic polycarbonate and polyester carbonate,
    B) a graft polymer of at least one vinyl monomer on at least one rubber having a glass transition temperature of <10° C. as graft base,
    C) vinyl (co)polymer having weight-average molecular weight of 1500 to 5000 g/mol and glass transition temperature of >40° C. consisting essentially of (1) α-me thyl styrene and (2) at least one member selected from a first group consisting of butyl acrylate and glycidyl methacrylate, and (3) at least one member selected from a second group consisting of styrene, acrylonitrile and maleic anhydride, D) at least one phosphorus-based flame retardant flame retardant conforming structurally to formula (IV)

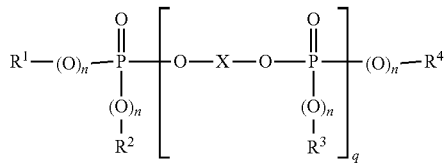
(IV)

wherein $R^1$, $R^2$, $R^3$ and $R^4$ mutually independently denote $C_1$ to $C_8$ alkyl, $C_5$ to $C_6$ cycloalkyl, $C_6$ to $C_{20}$ aryl or $C_7$ to $C_{12}$ aralkyl, n mutually independently denotes 0 or 1 q denotes 0 to 30 and

X denotes a mononuclear or polynuclear aromatic radical having 6 to 30 C atoms, or a linear or branched aliphatic radical having 2 to 30 C atoms, which may be OH-substituted and may contain up to 8 ether bonds, and E) an anti-dripping agent.

2. The composition according to claim 1 wherein the weight-average molecular weight $M_w$ of component C is 2000 to 4500 g/mol and its glass transition temperature is >50° C.

3. The composition according to claim 1, wherein X stands for a member selected from the group consisting of

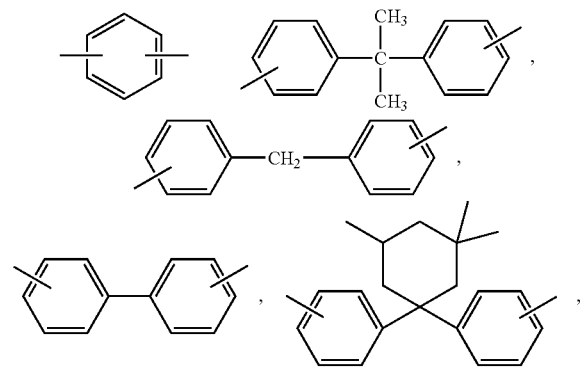

or chlorinated or brominated derivatives thereof $R^1$ stands for phenyl or $C_1$-$C_4$ alkyl-substituted phenyl and q denotes 0.5 to 6.

4. The composition according to claim 1, further containing at least one additive selected from the group consisting of lubricant, release agent, nucleating agent, antistatic agent, stabilizer, filler, reinforcing agent, flame retardant synergist, dye and pigment.

5. The composition according to claim 1 wherein the anti-dripping agent is fluorinated polyolefin in the form of a pre-compound or a masterbatch with a component B) or a vinyl (co)polymer.

6. The composition according to claim 5, wherein the anti-dripping agent is fluorinated polyolefin in the form of a pre-compound or masterbatch with styrene/acrylonitrile copolymer or polymethyl methacrylate.

7. A molded article comprising the composition of claim 1.

8. The composition of claim 1, wherein said A is present in an amount of 20 to 98 parts by weight, said B is present in an amount of 1 to 80 parts by weight and said C is present in an amount of 0.1 to 20 parts by weight.

9. The composition according to claim 1, wherein component B) comprise at least one graft polymers of 5 to 95% relative to the weight of the graft polymer of the polymerized product of a mixture comprising (i) 50 to 99% relative to the weight of the mixture of at least one monomer selected from a third group consisting of vinyl aromatic, ring-substituted vinyl aromatic and methacrylic acid ($C_1$-$C_8$) alkyl ester and (ii) 1 to 50% relative to the weight of the mixture of at least one monomer selected from a fourth group consisting of vinyl cyanide, (meth)acrylic acid ($C_1$-$C_8$) alkyl ester and derivative of unsaturated carboxylic acid on 95 to 5% relative to the weight of the graft polymer of a rubber having glass transition temperatures of <10° C. as graft base.

10. The composition according to claim 9, wherein said third group consists of styrene, α-methyl styrene and methyl methacrylate and wherein fourth group consists of acrylonitrile, maleic anhydride and methyl methacrylate.

11. The composition according to claim 9, wherein the mixture contains styrene and acrylonitrile.

12. The composition according to claim 9, wherein the graft base is at least one member selected from the group consisting of diene rubber, acrylate rubber, EP(D)M rubber, polyurethane rubber, and silicone rubber.

13. The composition according to claim 12, wherein the graft base is at least one member selected from the group consisting of diene rubber, acrylate rubber and silicone-acrylate rubber.

* * * * *